(12) United States Patent
Blanchard

(10) Patent No.: US 6,608,656 B1
(45) Date of Patent: Aug. 19, 2003

(54) LIQUID CRYSTAL DISPLAY DEVICE USING AN ELECTRODLESS FLUORESCENT LAMP

(76) Inventor: Randall D. Blanchard, 12658 Futura St., San Diego, CA (US) 92130

(*) Notice: Subject to any disclaimer, the term of this patent is extended or adjusted under 35 U.S.C. 154(b) by 0 days.

(21) Appl. No.: 09/364,378

(22) Filed: Jul. 30, 1999

(51) Int. Cl.[7] .......................... G06F 1/1335; F21V 7/04; G01D 11/28
(52) U.S. Cl. ............................ 349/61; 349/62; 349/70; 362/31; 362/26
(58) Field of Search .............................. 349/61, 62, 64, 349/70, 71, 58; 362/31, 26; 315/248

(56) References Cited

U.S. PATENT DOCUMENTS

| | | | |
|---|---|---|---|
| 4,487,481 A | * 12/1984 | Suzawa | 350/345 |
| 5,013,975 A | 5/1991 | Ukegawa et al. | |
| 5,645,337 A | * 7/1997 | Gleckman | 362/29 |
| 5,691,788 A | * 11/1997 | Kim | 349/96 |
| 5,754,159 A | 5/1998 | Wood et al. | |
| 5,813,233 A | * 9/1998 | Okuda et al. | 62/3.7 |
| 5,818,554 A | 10/1998 | Hiyama et al. | |
| 5,907,222 A | 5/1999 | Lengyel et al. | |
| 5,914,560 A | * 6/1999 | Winsor | 313/493 |
| 6,130,658 A | * 10/2000 | Yamamoto et al. | 345/102 |
| 6,243,149 B1 | * 6/2001 | Swanson et al. | 349/62 |
| 6,246,183 B1 | * 6/2001 | Buonavita | 315/248 |
| 6,336,728 B1 | * 1/2002 | Deloy | 362/31 |

FOREIGN PATENT DOCUMENTS

WO WO 99/36940 7/1999

OTHER PUBLICATIONS

OSRAM Sylvania, Syvania Icetron Inductively Coupled Electrodeless Lighting System, Design Guide, 7–98.
OSRAM Sylvania, Sylvania Icetron Inductively Coupled Electrdless Lightning System, Desgn Guide, Jul. 1998.*
Patent Abstracts of Japan, vol. 014, No. 479 (E–0992), Oct. 18, 1990 & JP 02 197096 A (Matsushita Electric Works LTD), Aug. 3, 1999 Abstract.

* cited by examiner

Primary Examiner—Robert H. Kim
Assistant Examiner—Mike Qi

(57) ABSTRACT

A display device (10) is comprised of a display unit (14) and a high efficiency backlight assembly (28). The backlight assembly (28) is comprised of an inductively coupled electrodless fluorescent lamp (12) for providing light to the display unit (14). The display unit (14) includes a liquid crystal display (LCD) element (16) for displaying an image and a diffuser (22) for using the light generated by the backlight unit (28) to create a relatively uniform level of brightness over the entire area of the LCD element (16). The electrodless lamp (12) is preferably mounted in a reflective lamp housing (24) having a reflective lamp lining (36) designed to provide uniform illumination intensity on the LCD element (16). The electrodless lamp (12) may have a rectangular shape and a center reflector (44) mounted within the rectangular opening to further direct light toward the LCD element (16). In a further version of the invention, a backlight unit (66) is comprised of a light guide (68) having remote electrodless lamps optically connected to the ends (70, 84) thereof.

23 Claims, 6 Drawing Sheets

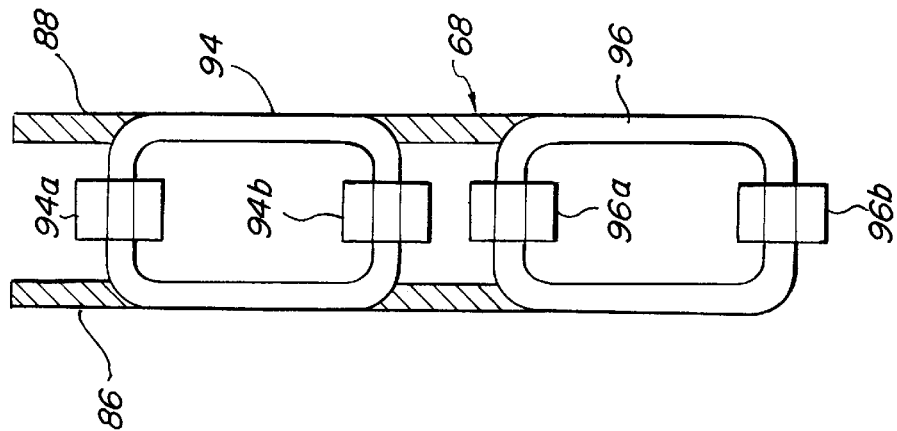
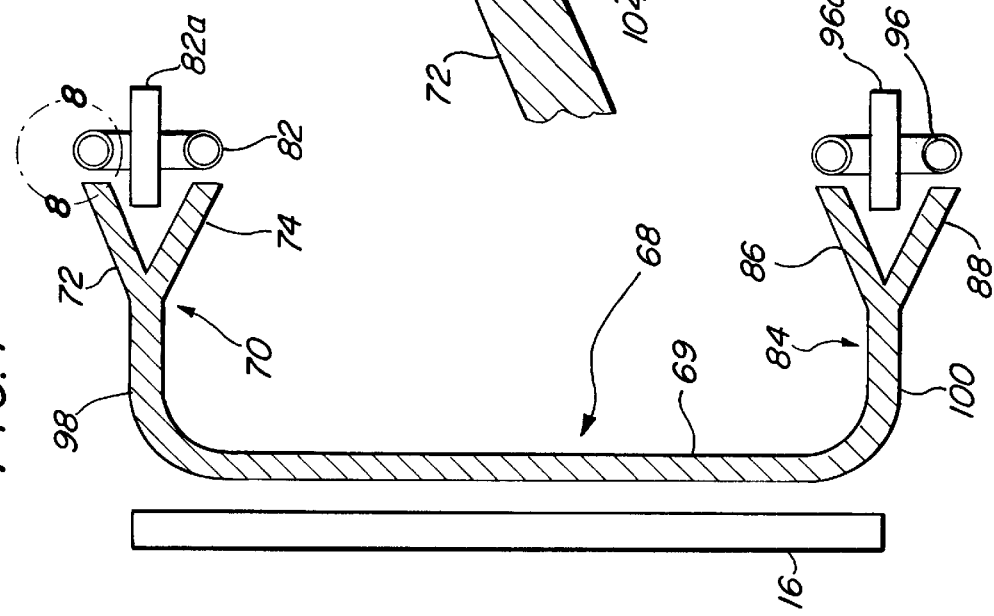

LIQUID CRYSTAL DISPLAY DEVICE USING AN ELECTRODLESS FLUORESCENT LAMP

BACKGROUND OF THE INVENTION

The present invention relates to liquid crystal displays including backlights for illuminating the displays.

Liquid crystal displays (LCDs) are used in a variety of applications, including portable computers, flat screen televisions and vehicle, ship and aircraft instrumentation. Most LCDs require an illumination source, or backlight unit, for backlighting the LCD so that the image displayed on the LCD can be seen by a viewer. For example, backlight units are described in U.S. Pat. Nos. 5,645,337 and 4,487,481, the disclosures of which are hereby incorporated herein by reference.

In designing such a backlight unit, the designer has to consider a number of design parameters. For example, the rated life of the backlight unit is an important consideration since frequent replacement of the backlight unit, or the light source therein, is costly and time consuming. The brightness of the display must be at a certain level in order for a viewer to see the image. Further, design concerns include the amount of time it takes for the backlight unit to begin operation after being turned on, the operating temperature of the backlight unit, the power consumption of the backlight unit, the stability of the brightness of the backlight unit over a temperature range and the amount of electromagnetic interference generated by the backlight unit.

The present invention may address one or more of the matters set forth above.

SUMMARY OF THE INVENTION

Certain aspects commensurate in scope with the originally claimed invention are set forth below. It should be understood that these aspects are presented merely to provide the reader with a brief summary of certain forms the invention might take and that these aspects are not intended to limit the scope of the invention. Indeed, the invention may encompass a variety of aspects not be set forth below and may encompass different combinations of the aspects set forth below.

In accordance with one aspect of the invention, there is provided a display device which includes an electrodless light source, or lamp and a display unit. The display unit comprises a LCD element for displaying an image using, in part, light generated by the lamp. A diffuser may be interposed between the lamp and the LCD element for uniformly illuminating the LCD element.

In accordance with another aspect of the invention, a backlight unit is comprised of a light guide which receives light from one or more lamps through one or more of its ends.

These and other features and advantages of the present invention will become apparent from the following detailed description, the accompanying drawings and the appended claims.

BRIEF DESCRIPTION OF THE DRAWINGS

The foregoing and other features of the invention will become apparent upon reading the following detailed description and upon reference to the drawings in which:

FIG. 6 illustrates an end view taken along line 6—6 of FIG. 5;

FIG. 7 illustrates yet another version of the backlight assembly; and

FIG. 8 illustrates a detailed view of the backlight assembly taken in section 8.

DETAILED DESCRIPTION OF THE INVENTION

One or more specific versions of the present invention will be described below. In an effort to provide a concise description of these versions, not all features of an actual implementation are described in the specification. It should be apparent that in the development of any such actual implementation, as in any engineering or design project, numerous implementation-specific decisions must be made to achieve specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
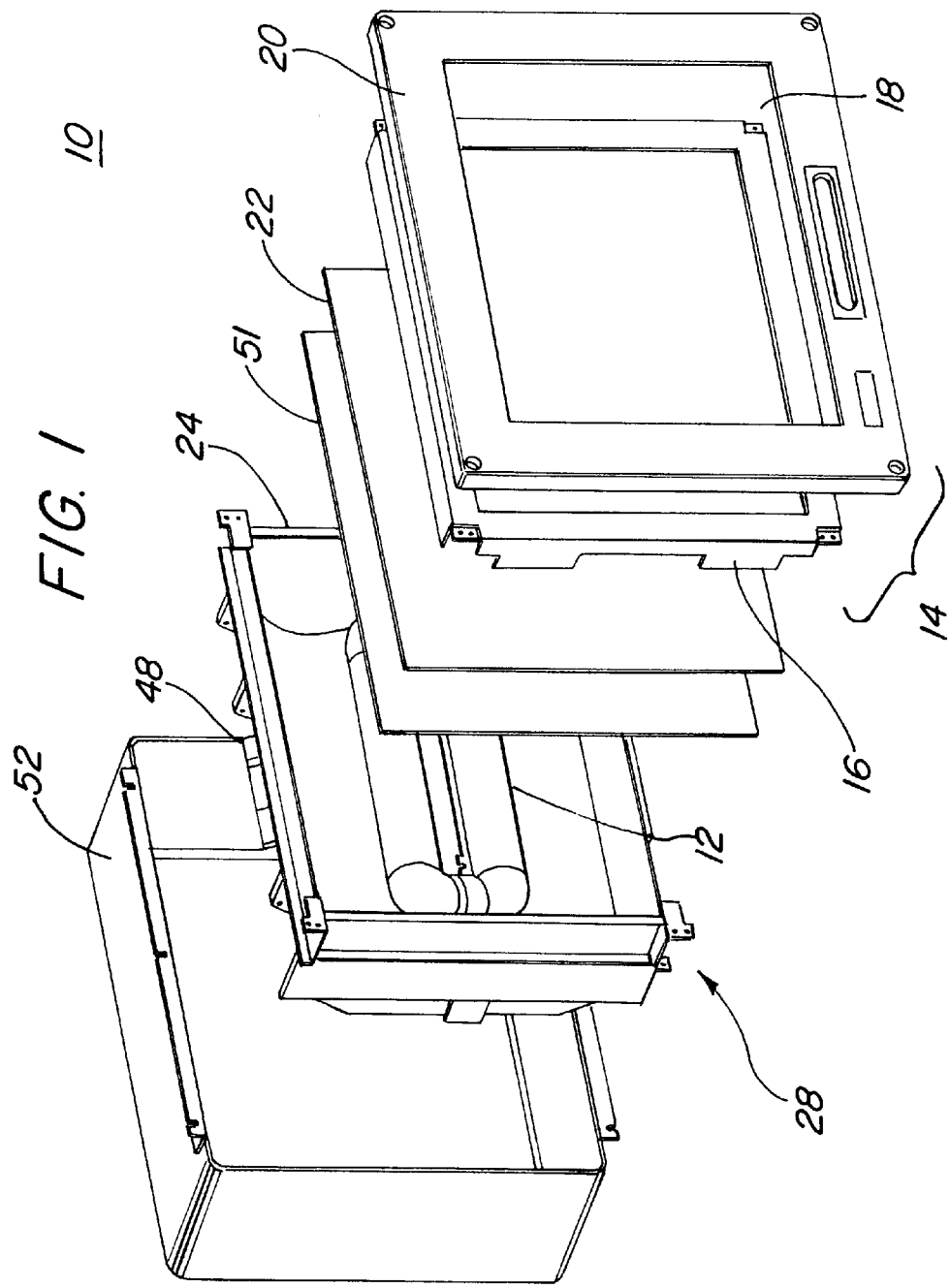
FIG. 1 is an exploded view of a display device having a liquid crystal display element and a backlight assembly.
Figure 2:
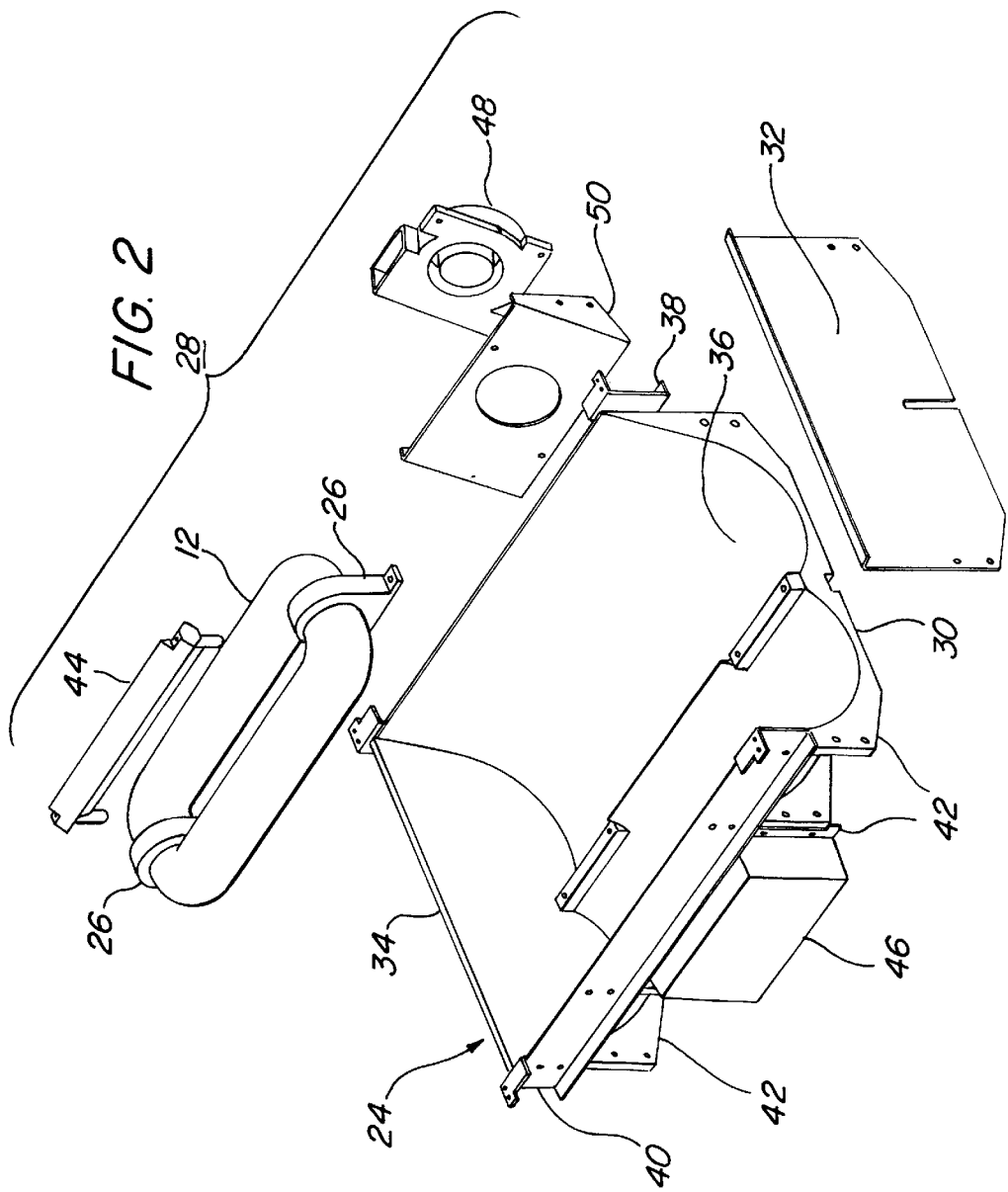
FIG. 2 is an exploded view of one version of a backlight assembly, which may be used in the display device shown in FIG. 1.
Figure 3:
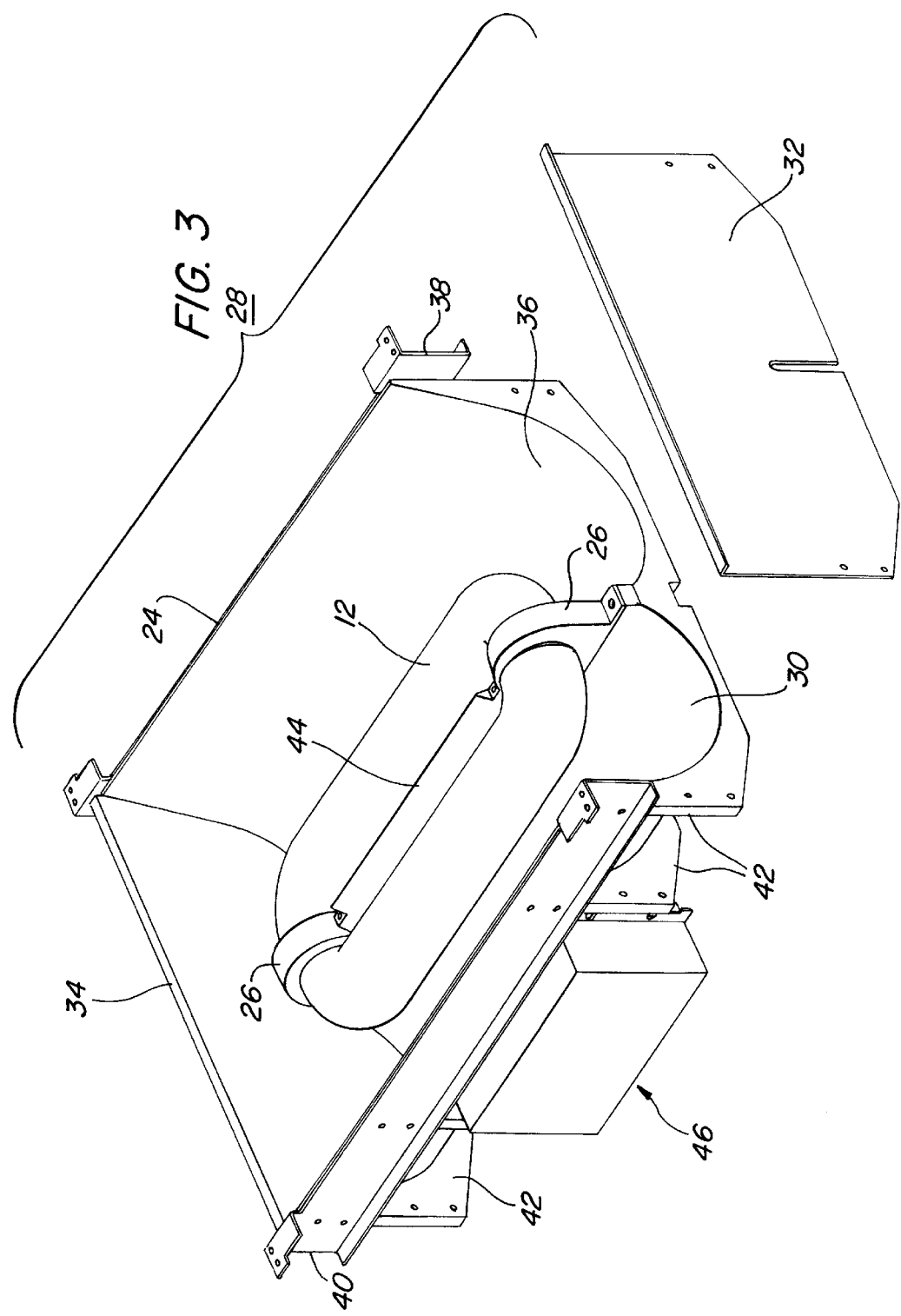
FIG. 3 is a perspective view of the backlight assembly shown in FIG. 2 with an end plate removed for clarity.

With reference initially to FIGS. 1 through 3, a display device, generally designated by reference numeral 10, having at least one electrodless fluorescent lamp 12 is illustrated. The display device 10 may be used in any number of other devices, such as shipboard controls, automated teller machines, gas pumps, and the like. In addition, the display device 10 may include numerous additional features, which could be readily incorporated therein by those skilled in the art. For example, touch screen capability or other input device capability may be readily incorporated into the display device 10. The display device 10 includes a display unit 14 having a liquid crystal display (LCD) element 16 that responds to appropriate electrical inputs to display an image. A number of LCD elements are known in the art. Since the structure and philosophy of the LCD element is not important to the present invention beyond the generation of an image, details of such elements will not be further disclosed herein. Those desiring additional information regarding LCD elements are referred to U.S. Pat. Nos. 5,012,274 and 3,824,003, the disclosures of which are incorporated herein by reference.

The front of the LCD element 16 is typically protected by a transparent screen 18, which is normally made of glass or plastic. The screen 18 is mounted within an opening on a front frame 20 of the display unit 14 so users may clearly view the image displayed by the LCD element 16. A diffuser 22 is shown adjacent the LCD element 16. Advantageously, the display unit 14 is designed so the diffuser 22 receives light from the lamp 12 and transmits this light to the LCD element 16 such that the LCD element 16 is substantially uniformly illuminated. As those skilled in the art will readily appreciate, diffusers are well known and, consequently, will not be further described herein. The mounting structure shown for the components of the display device 10 are for exemplary purposes only and should not be considered limiting. It will be readily understood by those skilled in the art that various mounting arrangements may exist and be readily used depending on the type of application in which the display device 10 is intended to be used. For example, if the display device 10 is to be used in a harsh environment, the mounting structure may be made shock and water resistant.

The lamp 12 is preferably an inductively coupled electrodeless lamp, such as sold by OSRAM SYLVANIA Products, Inc., located in Danvers, Mass., United States of America, under the product names, ICETRON™ 100 and ICETRON™ 150, which are described in a SYLVANIA ICETRON Design Guide, Document no. FL022 July 1998. As is known, such lamps use magnetic-induction technology instead of an electrode at each end of the fluorescent tube to operate. The lamp 12 is excited by a radio frequency (RF) magnetic field supplied by a pair of lamp transformers 26, or drive inductors. The ICETRON™ lamps operate at a frequency of 250 kHz. When incorporated into the display device 10, such known lamps overcome deficiencies in the prior art by providing a long rated lamp life, a high level of brightness at a relatively low lamp power, substantially instant on capabilities, stable brightness over a wide temperature range, low electromagnetic interference and a large operating temperature range. Although the lamp 12 is shown having a generally rectangular shape, it should be apparent that other electrodeless lamp configurations may be advantageously employed in the invention.

The lamp 12 and the lamp housing 24 are part of a backlight assembly, generally designated by reference numeral 28. The backlight assembly 28 is shown in detail in FIGS. 2 and 3. The lamp housing 24 includes a back reflective surface 30 and two removable, end plates 32, 34. Preferably, the back reflective surface 30 and the two end plates 32, 34 are coated with a reflective material, which may be aluminium, or silver, based, or formed from a reflective material to form a reflective lamp lining 36. As should be appreciated, the lamp housing 24 may be formed, or stamped, from a single material in any number of well known manufacturing processes. The reflective lamp lining 36 is preferably formed so as to reflect light generated by the lamp 12 in a uniform manner toward the diffuser 22 and the LCD element 16. Numerous software programs are known to those skilled in the art for designing the shape of the reflective lamp lining 36 to optimize the amount and uniformity of the light reflected. For structural integrity and mounting purposes, the lamp housing 24 includes two longitudinal supports 38, 40. For further structural integrity, a plurality of ribs 42 provide support to the reflective lamp lining 36 and interconnect the longitudinal supports 38, 40. As should be appreciated, the ribs 42 are preferably shaped to conform to the shape of the reflective lamp lining 36 for optimum support.

To further direct light generated by the lamp 12 which is transmitted to the diffuser 22, a center reflector 44 may be position in the center of the lamp 12. The center reflector 44 has a generally triangular shape, although other shapes may be used. A ballast 46 regulates the power provided to the lamp 12 in a known manner. Preferably, the ballast 46 is a QULICKTRONIC® I.C.E. sold by OSLAM SYVANIA. Those skilled in the art will readily comprehend that other ballast designs may be advantageously employed in the invention. As is known, such other ballast designs may also preferably include the capability for dimming the lamp.

For cooling the display device 10, a fan 48 is mounted via a fan bracket 50 to the lamp housing 24. It should be appreciated that other mounting configurations for the fan 48 may be advantageously used in the invention. In addition, other methods for controlling the lamp operating temperature may be readily employed in the invention. In addition, as those skilled in the art will readily comprehend, an electronic control system would be used to control the cooling device. Such electronic control systems are well known in the art and, therefore, will not be further discussed herein.

A further method for cooling the display unit 14 may be to insert a heat absorbing sheet of glass 51 in front of the lamp 12. Since the lamp 12 provides a very bright light, the glass 51 can be relatively inefficient at passing light and, hence, relatively inexpensive. This provides an air path to cool the back to the LCD element 16 without excessively cooling the lamp 12. A back casing 52 attaches to the front frame 20 to enclose the backlight assembly 28 and the display unit 14.

Figure 4:
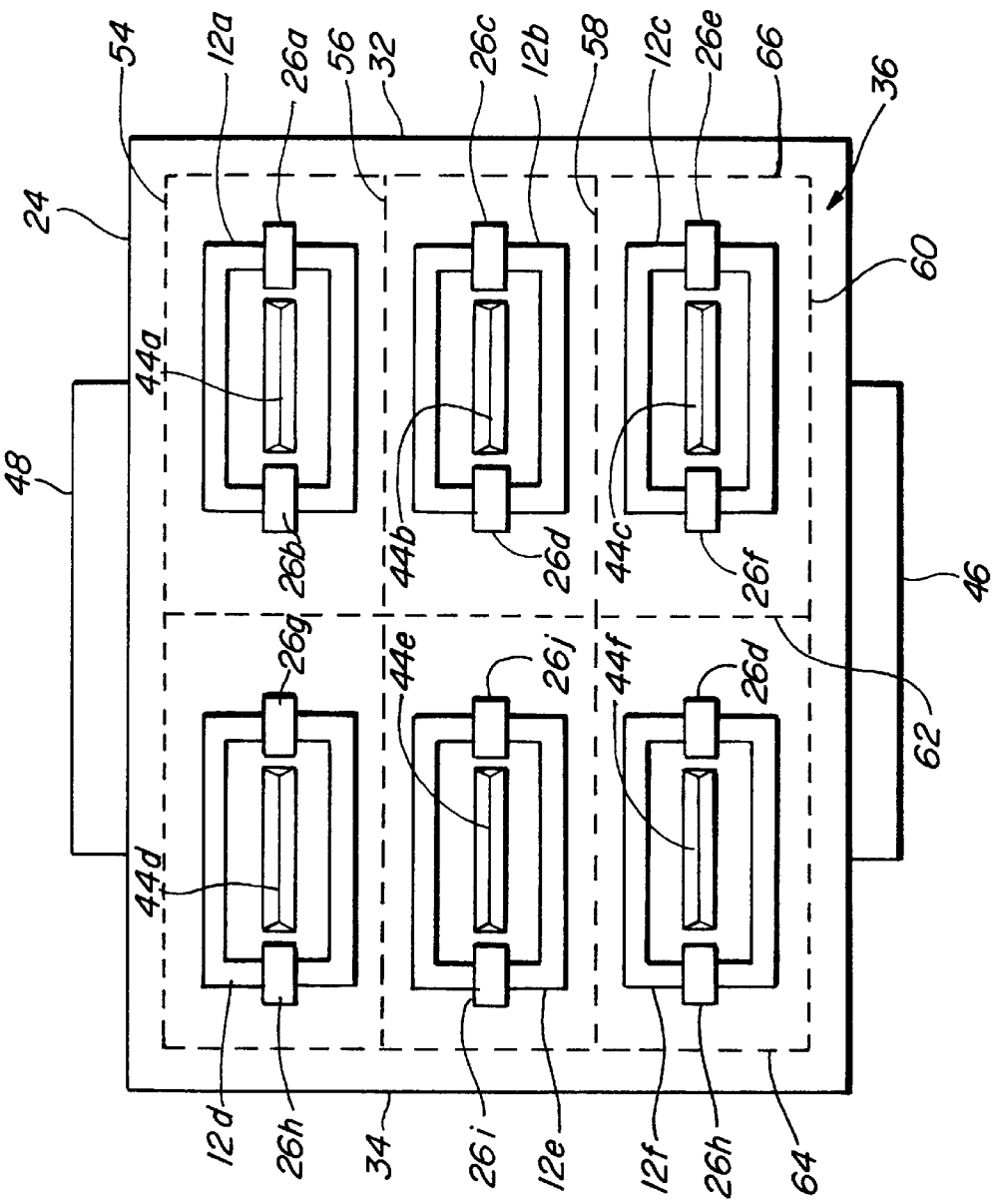
FIG. 4 illustrates a front view of another version of a backlight assembly.

Another version of the invention is shown in FIG. 4 where like elements use like reference numerals. This version employs a plurality of inductively coupled electrodeless lamps 12a through 12f. Each of the lamps 12a through 12f has an associated pair of transformers 26a through 26l and an associated center reflector 44a through 44f. The reflective lamp lining 36 is shaped, or formed, to substantially uniquely reflect light from each of the lamps 12a through 12f to the display unit 14. Preferably, the reflective lamp lining 36 is formed with individual trough-shaped reflective surfaces partially enclosing each of the lamps 12a through 12f. The ridges of the trough-shaped surfaces are generally designated as dashed lines 54 through 64.

Figure 5:
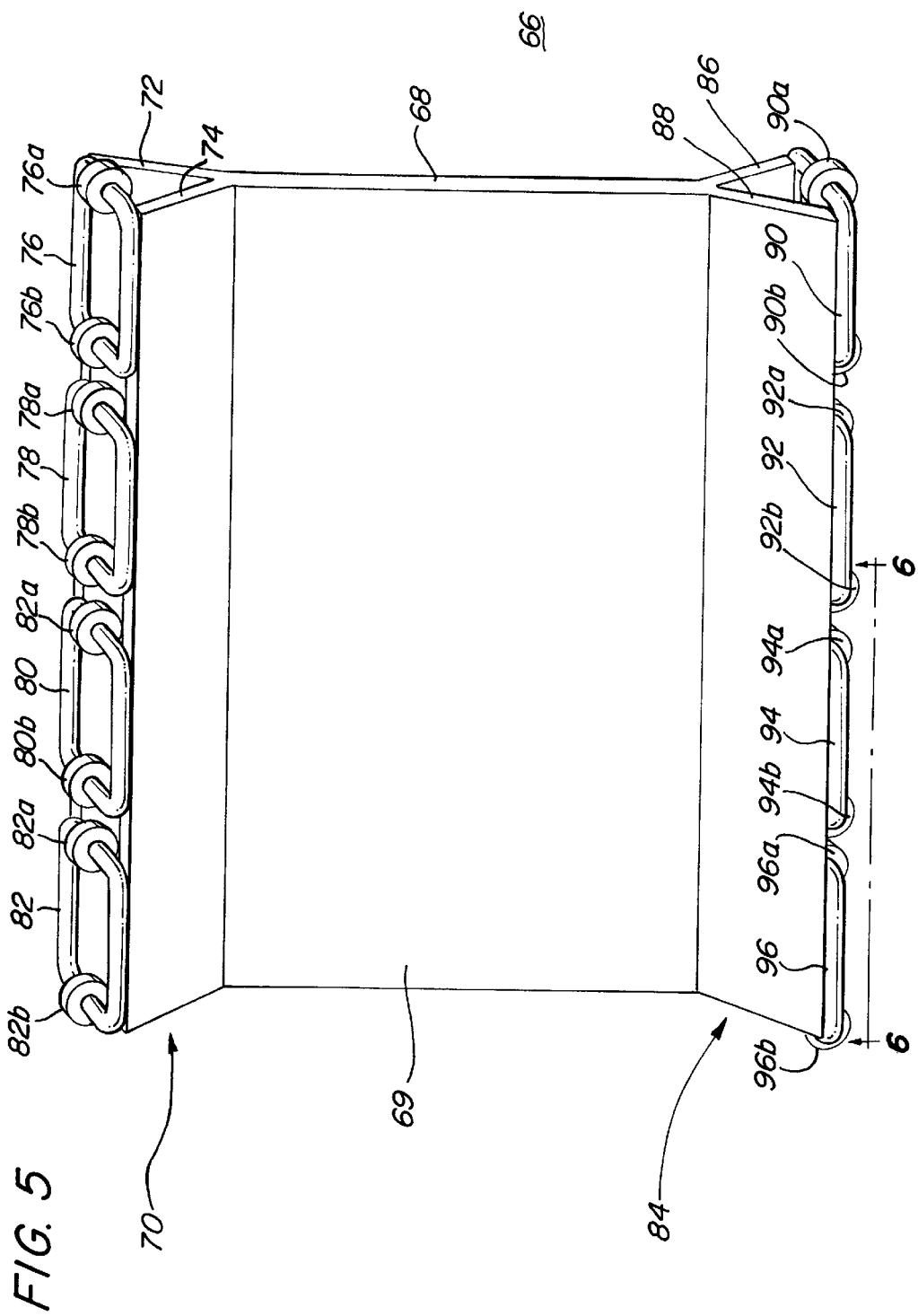
FIG. 5 illustrates a perspective view of a backlight unit which may be used in the backlight assemblies shown in FIGS. 2 through 4.

With reference now to FIGS. 5 through 8, another version of the invention will be described. For clarity and ease of description, the same reference numerals are used for like components as in FIGS. 1 through 4. In FIG. 5 a backlight unit 66 for generating light to be used by the LCD element 16 to enhance viewing of an image is shown. The backlight unit 66 is comprised of a light guide 68 formed of a sheet of light transmissive material, such as glass or plastic, in operable relation to the LCD element 14. The light guide 68 may comprise a center section 69 having a first end 70 comprised of a first leg 72 and a second leg 74 formed in a wedge shape. A first series of inductively coupled electrodeless lamps 76, 78, 80 and 82 are positioned to provide light to the first end 70 of the light guide 68. Specifically, the first series of lamps 76, 78, 80 and 82 are positioned so that the long sides of their rectangular shapes are optically coupled to the first and second legs 72, 74. Each of the first series of lamps 76, 78, 80 and 82 has a respective pair of transformers 76a, 76b, 78a, 78b, 80a, 80b, 82a, 82b associated therewith.

Similarly, the light guide 68 may include a second end 84 comprised of a first leg 86 and a second leg 88 formed in a wedge shape. A second series of inductively coupled electrodeless lamps 90, 92, 94 and 96 are positioned to provide light to the second end 84 of the light guide 68. The second series of lamps 90, 92, 94 and 96 are positioned so that the long sides of their rectangular shapes are optically coupled to the first and second legs 86, 88. Each of the second series of lamps 90, 92, 94 and 96 has a respective pair of transformers 90a, 90b, 92a, 92b, 94a, 94b, 96a, 96b associated therewith. Transformers 96 and 94 are shown in plane view in FIG. 6. It should be understood that various configurations may be readily developed by those skilled in the art with the assistance of this disclosure. For example, a single lamp may be employed at one or more of the first and second ends 70, 84 to provide light to the light guide 68. The first and second ends 70, 84 may be in shapes, or configurations, other than a wedge shape. For example, the first and second ends 70, 84 may be just the edge of the front surface 69.

Another exemplary configuration of the light guide 68 is shown in FIG. 7. In this version of the invention, the first and second ends 70, 84 respectively comprise first and second end sections 98, 100 attached at an angle, such as 90 degrees, to the center section 69 of the light guide 68. The first and second end sections 98, 100 optically interconnect the respective lamps 82, 96 and the center section 69. As will be appreciated, this configuration limits the amount of space needed above and below the LCD element 16 and permits the lamps 82, 96 to be located a significant distance away from the LCD element 16. As will be readily understood by those skilled in the art, the aspect ratio of lamp loop length to lamp diameter should be made as low as possible to increase efficiency.

As shown in FIG. 8, the lamp 82 can be an aperture lamp, which is designed to direct the light generated by the lamp 82 into the first leg 72 of the light guide 68. As is known in the art, a phosphor coating 102 can be inserted into the lamp 82 having an aperture 104 therein. Consequently, light generated in the lamp 82 exits the lamp 82 substantially through the aperture 104. By aligning the aperture 104 and the first leg 72, substantially all of the generated light will impinge upon the first leg 72. As should be readily apparent, such an aperture may be utilized in some or all of the optical interfaces between the lamps and the light guide 68. To further improve their optical interface, the lamp 84 and the first leg 72, may be bonded together using an optically clear adhesive, such as a RTV silicon. Aperture lamps are well known in the art and, therefore, will not be further discussed herein.

While the invention may be susceptible to various modifications and alternative forms, specific versions have been shown by way of example in the drawings and have been described in detail herein. However, it should be understood that the invention is not intended to be limited to the particular versions disclosed. Rather, the invention is to cover all modifications, equivalents, and alternatives falling within the spirit and scope of the invention as defined by the appended claims.

What is claimed is:

1. A backlight unit for generating light used for enhancing viewing of an image displayed on a liquid crystal display element, comprising:
   a light guide in operable relation to the liquid crystal display element, the light guide comprising a first and second end and a center section in operable relation to the liquid crystal display element, at least one of the first and second ends connected at an angle to the center section; and
   at least one electrodless fluorescent lamp for providing at least a portion of the light into at least one of the first and second ends of the light guide.

2. The backlight unit recited in claim 1 wherein the electrodless fluorescent lamp comprises an inductively coupled electrodless fluorescent lamp.

3. The backlight unit recited in claim 1 wherein the lamp has a substantially rectangular shape.

4. The backlight unit recited in claim 1 further comprising a lamp housing for directing a portion of the light emitted by the lamp for use by the display unit to enhance viewing of the image.

5. The backlight unit recited in claim 4 wherein the lamp housing comprises a reflective inner lining for reflecting light generated by the lamp onto the display unit.

6. The backlight unit recited in claim 5 wherein the reflective inner lining comprises a silver based coating material.

7. The backlight unit recited in claim 5 wherein the lamp is mounted on the lamp housing.

8. The backlight unit recited in claim 1 further comprising a temperature control system for regulating temperature of the display unit without cooling the lamp below its operating temperature.

9. The backlight unit recited in claim 8 wherein the temperature control system comprises a fan unit.

10. The backlight unit recited in claim 4 wherein the lamp housing comprises:
    a back surface with a reflective lining; and
    two end surfaces attached to the back surface.

11. The backlight unit recited in claim 1 further comprising a plurality of electrodless fluorescent lamps.

12. The backlight unit recited in claim 1 comprising a lamp housing for substantially redirecting light emitted by the plurality of electrodless fluorescent lamps for use by the display unit to enhance viewing of the image.

13. The backlight unit recited in claim 12 wherein the lamp housing comprises a reflective inner lining for reflecting light generated by the plurality of lamps onto the display unit.

14. The backlight unit recited in claim 13 wherein the reflective inner lining is formed to substantially uniquely reflect light from each of the plurality of lamps onto the display unit.

15. The backlight unit of claim 1 wherein the at least one end section is attached at an approximately 90 degree angle to the center section.

16. The backlight unit of claim 1 wherein the at least one lamp provides at least a portion of the light into both the first and second ends.

17. The backlight unit of claim 1 wherein the at least one lamp comprises a series of lamps aligned along one of the first and second ends.

18. The backlight unit of claim 1 wherein at least one of the first and second ends of the light guide is configured in a wedge shape having a first and second leg, and wherein the at least one lamp provides at least a portion of the light to the first and second legs.

19. The backlight unit of claim 18 comprising a series of lamps.

20. The backlight unit of claim 19 where both the first end and the second end of the light guide comprise first and second legs, and wherein the series of lamps comprise:
    a first series of lamps positioned to provide light to the first and second legs of the first end; and
    a second series of lamps positioned to provide light to the first and second legs of the second end.

21. The backlight unit of claim 1 wherein the lamp comprises an aperture lamp designed to direct the light generated therein into an end of the light guide.

22. The backlight unit recited in claim 21 further comprising optically clear adhesive bonding the aperture lamp to the end section.

23. The backlight unit recited in claim 1 further comprising optically clear adhesive bonding the electrodless fluorescent lamp to the first or second end of the light guide.

* * * * *